United States Patent
Kaiser et al.

(10) Patent No.: US 7,888,429 B2
(45) Date of Patent: Feb. 15, 2011

(54) EPOXY-MODIFIED VINYL CHLORIDE-VINYL ESTER COPOLYMER SOLID RESIN

(75) Inventors: Stephan Kaiser, Altoetting (DE); Karl Weber, Unterneukirchen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/584,101

(22) Filed: Aug. 31, 2009

(65) Prior Publication Data

US 2009/0321016 A1   Dec. 31, 2009

Related U.S. Application Data

(63) Continuation of application No. 11/219,903, filed on Sep. 6, 2005, now abandoned, which is a continuation of application No. PCT/EP2004/002213, filed on Mar. 4, 2004.

(30) Foreign Application Priority Data

Mar. 6, 2003   (DE) ................. 103 09 857

(51) Int. Cl.
| | |
|---|---|
| C08L 27/06 | (2006.01) |
| C08L 11/02 | (2006.01) |
| C08L 31/04 | (2006.01) |
| C08L 33/06 | (2006.01) |
| C08F 214/06 | (2006.01) |
| C08F 2/16 | (2006.01) |
| C08K 5/09 | (2006.01) |

(52) U.S. Cl. ............... 524/834; 524/81; 524/804; 524/823; 524/832

(58) Field of Classification Search .......... 524/81, 524/284, 567, 543, 556, 560, 563, 804, 823, 524/832, 834
See application file for complete search history.

(56) References Cited

U.S. PATENT DOCUMENTS

| | | | | |
|---|---|---|---|---|
| 2,993,034 | A |   | 7/1961 | Swern |
| 4,345,056 | A | * | 8/1982 | Thyret et al. ............. 526/200 |
| 4,693,934 | A | * | 9/1987 | Nishimatsu et al. ......... 428/336 |
| 4,707,411 | A |   | 11/1987 | Nakayama et al. |
| 4,900,777 | A |   | 2/1990 | Ball et al. |
| 4,970,127 | A | * | 11/1990 | Smith et al. ............ 428/844.9 |

FOREIGN PATENT DOCUMENTS

| | | |
|---|---|---|
| DE | 3829711 | 3/1990 |
| EP | 0264916 | 4/1988 |
| EP | 0989162 | 3/2000 |
| GB | 1596689 | 8/1981 |
| JP | 45-038260 | 12/1970 |
| JP | 57-108140 | 7/1982 |
| JP | 03-086744 | 4/1991 |
| JP | 05-202255 | 8/1993 |
| JP | 07-278209 | 10/1995 |
| JP | 08002154 A | * 1/1996 |
| JP | 10-168104 | 6/1998 |
| JP | 10-182909 | 7/1998 |
| JP | 11-100485 | 4/1999 |
| JP | 11-140256 | 5/1999 |
| JP | 11-511195 | 9/1999 |
| JP | 2001-139698 | 5/2001 |

OTHER PUBLICATIONS

Abstract in English; JP 08002154 A; Jan. 1996; Inabe et al.*
English Abstract corresponding to JP 11-100485, Apr. 13, 1994.
English Abstract corresponding to JP 11-511195, Sep. 28, 1999.
English Abstract corresponding to JP 11-140-256, May 25, 1999.
English Abstract corresponding to JP 10-168104, Jun. 23, 1998.
English Abstract corresponding to JP 07-278209, Oct. 24, 1995.
English Abstract corresponding to JP 03-086744, Apr. 11, 1991.
English Abstract corresponding to JP 05-202255, Aug. 10, 1993.
English Abstract corresponding to JP 45-038260, Dec. 3, 1970.
English Abstract corresponding to JP 57-108140, Jul. 6, 1982.
English Abstract corresponding to JP 10-182909, Jul. 7, 1998.
English Abstract corresponding to JP 2001-139698, May 22, 2001.
Inabe et al. Jan. 9, 1996, English translation of JP 08002154 A, Jan. 9, 1996.
Derwent Abstract, WP1, 1991, Ref. 91—249136/34 (Example) Corr. to JP 03-162405.
Derwent Abstract, Corres. to DE 3829711, [AN 1990-07627], Mar. 22, 1990.
Derwent Abstract, WP1, 1992, Ref. 92—147675/18, Corres. to JP 04-089810.

* cited by examiner

Primary Examiner—Vasu Jagannathan
Assistant Examiner—Karuna P Reddy
(74) Attorney, Agent, or Firm—Brooks Kushman P.C.

(57) ABSTRACT

A process for the preparation of epoxy-modified vinyl chloride-vinyl ester copolymers in the form of the solid resins involves aqueous, free radical polymerization of a mixture comprising
a) from 50 to 90% by weight of vinyl chloride,
b) from 5 to 25% by weight of epoxide-containing vinyl monomers and
c) from 5 to 25% by weight of one or more vinyl esters of straight-chain or branched alkylcarboxylic acids having 1 to 18 carbon atoms,
d) from 0 to 40% by weight of further comonomers copolymerizable with a), b) and c), the data in % by weight summing to 100% by weight,
and subsequent drying of the aqueous dispersions obtained thereby, polymerization being effected by means of suspension polymerization in the presence of aldehyde regulators.

18 Claims, No Drawings

EPOXY-MODIFIED VINYL CHLORIDE-VINYL ESTER COPOLYMER SOLID RESIN

CROSS-REFERENCE TO RELATED APPLICATIONS

This application is a continuation of U.S. application Ser. No. 11/219,903 filed Sep. 6, 2005, which is a continuation of U.S. National Phase PCT Application No. PCT/EP2004/002213, filed Mar. 4, 2004, and claims priority to German Application No. 103 09 857.7, filed Mar. 6, 2003.

BACKGROUND OF THE INVENTION

1. Field of the Invention

The invention relates to a process for the preparation of epoxy-modified vinyl chloride-vinyl ester copolymer solid resins and to the use thereof, in particular in coating resin compositions.

2. Background Art

Vinyl chloride copolymers containing epoxy groups are used as binders in coatings. Their use in heat-seal coatings, for example, for aluminum coating, should be singled out. Epoxy-containing vinyl chloride-vinyl acetate copolymers are well established but are obtainable only as solutions, for example in toluene and/or methyl ethyl ketone. For the user, this has the disadvantage that the choice of the solvent in which the coating resin is applied is greatly limited, for example to the solvent in which the coating resin is offered, or to solvents compatible therewith.

SUMMARY OF THE INVENTION

Against this background, an object of the invention is to provide epoxy-modified vinyl chloride-vinyl ester copolymers in the form of solid resins. This and other objects are achieved by a process in which vinyl chloride is copolymerized with epoxy group-containing comonomers and vinyl ester comonomers in the presence of aldehyde molecular weight regulators.

DETAILED DESCRIPTION OF THE PREFERRED EMBODIMENT(S)

The invention relates to a process for the preparation of epoxy-modified vinyl chloride-vinyl ester copolymers in the form of solid resins obtainable by means of aqueous, free radical polymerization of a mixture comprising
  a) from 50 to 90% by weight of vinyl chloride,
  b) from 5 to 25% by weight of epoxide-containing vinyl monomers and
  c) from 5 to 25% by weight of one or more vinyl esters of straight-chain or branched alkylcarboxylic acids having from 1 to 18 carbon atoms,
  d) from 0 to 40% by weight of further comonomers copolymerizable with a), b) and c), the weight percentages totaling 100% by weight, and subsequent drying of the aqueous dispersions obtained thereby, characterized in that polymerization is effected by means of suspension polymerization in the presence of regulators selected from the group consisting of the aldehydes.

Preferably from 70 to 90% by weight, more preferably from 75 to 85% by weight of vinyl chloride is copolymerized.

Suitable epoxide-containing vinyl monomers b) are, for example, methylglycidyl methacrylate, methyl glycidyl acrylate, allyl glycidyl ether, allylphenol glycidyl ether and glycidyl methacrylate. Glycidyl methacrylate (GMA) is preferred. Preferably from 5 to 15% by weight, more preferably from 8 to 15% by weight of epoxide-containing vinyl monomers b), in particular glycidyl methacrylate, are copolymerized.

Preferred vinyl ester monomers c) are those of carboxylic acids having 1 to 12 carbon atoms. Vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 13 carbon atoms, for example VeoVa9$^R$ or VeoVa10$^R$ (trade names of Shell) are particularly preferred. Vinyl acetate is most preferred. Preferably from 5 to 15% by weight of the vinyl ester monomers c), in particular vinyl acetate, are copolymerized.

Suitable further copolymerizable comonomers d) include one or more ethylenically unsaturated monomers from the group of acrylates or methacrylates of branched or straight-chain alcohols or diols having 1 to 18 carbon atoms, and ethylenically unsaturated mono- and dicarboxylic acids and anhydrides thereof.

Preferred monomers from the group consisting of acrylates or methacrylates are esters of straight-chain or branched alcohols having 1 to 15 carbon atoms. Particularly preferred methacrylates or acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate and 2-ethylhexyl acrylate. Methyl acrylate, methyl methacrylate, n-butyl acrylate, tert-butyl acrylate and 2-ethylhexyl acrylate are most preferred.

Examples of suitable ethylenically unsaturated mono- and dicarboxylic acids and anhydrides thereof are acrylic acid, methacrylic acid, fumaric acid, itaconic acid, crotonic acid, maleic acid and maleic anhydride.

The free radical polymerization is effected by means of suspension polymerization. The polymerization temperature is in general from 20° C. to 80° C. The initiation of the polymerization can be effected with the customary water-soluble or monomer-soluble initiators or redox initiator combinations. Examples of water-soluble initiators are the sodium, potassium and ammonium salts of peroxoydisulfuric acid. Examples of monomer-soluble initiators are dicetyl peroxydicarbonate, dicyclohexyl peroxydicarbonate, dibenzoyl peroxide and tert-butyl peroxypivalate. The initiators are used in general in an amount of from 0.01 to 1.0% by weight, preferably from 0.1 to 0.5% by weight, based in each case on the total weight of the monomers.

In the suspension polymerization, polymerization is effected in water in the presence of surface-active substances such as protective colloids and/or emulsifiers. Suitable protective colloids are, for example, partly hydrolyzed polyvinyl alcohols and cellulose ethers. Suitable emulsifiers are anionic, cationic and nonionic emulsifiers, for example anionic surfactants such as alkylsulfates having a chain length of from 8 to 18 carbon atoms, alkane- or alkylarylsulfonates having from 8 to 18 carbon atoms, ester and monoesters of sulfosuccinic acid with monohydric alcohols or alkylphenols, or nonionic surfactants such as alkylpolylglycol ethers or alkylarylpolyglycol ethers having up to 60 ethylene oxide or propylene oxide units.

For improving the thermal stability of the solid resins, from 0.001 to 0.1% by weight, preferably from 0.005 to 0.05% by weight of ascorbic acid and/or isoascorbic acid, based in each case on the total weight of the comonomers, are optionally added during or after the polymerization. Ascorbic acid is preferably used. The addition is preferably effected after the end of the monomer metering and before, during or after the removal of residual monomers. An embodiment in which citric acid is also added in addition to ascorbic acid and/or isoascorbic acid is most preferred. The amount of citric acid is from 0.001 to 0.1% by weight, preferably from 0.005 to 0.05% by weight, based in each case on the total weight of the comonomers.

For controlling the molecular weight, regulating substances are used during the polymerization. The regulators are used in amounts of from 0.02 to 10.0% by weight, based on the monomers to be polymerized, and are metered separately or in a form premixed with reaction components. Suitable regulators are aldehydes such as acetaldehyde, propionaldehyde, butyraldehyde and isobutyraldehyde.

Polymerization is preferably effected in the presence of propionaldehyde. Compared with other regulators such as, for example, trichloroethylene, propionaldehyde has the advantage that a regulating effect is achieved even with small amounts. It is therefore preferably added in an amount of from 0.02 to 5% by weight, based on the monomer, depending on the desired molecular weight.

The monomers can be metered in together or can be initially introduced in portions and the remainder metered in after initiation of the polymerization. The meterings can be carried out separately (with respect to space and time), or some or all of the components to be metered can be metered in preemulsified form. After the end of the polymerization, postpolymerization can be effected for removing residual monomers with the use of known methods, for example by postpolymerization initiated by a redox catalyst. Volatile residual monomers can also be removed by means of distillation, preferably under reduced pressure, and optionally by passing inert entraining gases such as air, nitrogen or steam, through or over the reaction mixture.

The epoxy-modified vinyl chloride-vinyl ester copolymers can be isolated from the aqueous dispersion in the form of solid resin by means of customary methods, by precipitation, filtration and subsequent drying, or by means of decanting and subsequent drying. The drying can be effected in a manner known to those skilled in the art, for example in a tumble drier, in a flow tube, in a fluidized bed, or in a cyclone drier.

The epoxy-modified vinyl chloride-vinyl ester copolymers are distinguished by high blocking resistance up to 180° C., and by high chemical resistance to solvents, acids and bases.

The epoxy-modified vinyl chloride-vinyl ester copolymers in the form of their solid resins are suitable, for example, as adhesives, in particular for the adhesive bonding of security features in banknotes or plastic cards, and as binders for coatings, for example for aluminum coatings.

The following examples serve for further explanation of the invention:

Example 1

A copolymer comprising 82% by weight of vinyl chloride, 9% by weight of vinyl acetate and 9% by weight of glycidyl methacrylate was prepared by the suspension polymerization process, the comonomers having been completely initially introduced before initiation of the polymerization. After the end of the polymerization, the batch was let down to atmospheric pressure, and 0.05% by weight of ascorbic acid was added. Thereafter, demonomerization was effected and the copolymer was filtered, washed and dried. A white, flowable powder was obtained.

Example 2

A copolymer was prepared from 82% by weight of vinyl chloride, 9% by weight of vinyl acetate and 9% by weight of glycidyl methacrylate by the emulsion polymerization process. At the end of the reaction, the mixture was let down to atmospheric pressure and 0.02% by weight of ascorbic acid and 0.0025% by weight of citric acid, based in each case on the total weight of the comonomers and in each case as a 10% strength aqueous solution, were added to the batch. Thereafter, demonomerization was effected and the copolymer was precipitated, filtered, washed and dried. A white, flowable powder was obtained.

Example 3

The procedure was analogous to example 2, with the difference that polymerization was effected in the presence of 2% by weight of propionaldehyde, based on total monomer. A 20% strength by weight solution of the copolymer in methyl ethyl ketone had a lower solution viscosity than the product from example 3 and remained completely colorless even after a storage time of one week at 60° C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparation of epoxy-modified vinyl chloride-vinyl ester copolymers as a solid resin, comprising free radically polymerizing an aqueous mixture comprising
   a) from 50 to 90 percent by weight of vinyl chloride,
   b) from 5 to 25 percent by weight of one or more epoxide-containing vinyl monomers b), selected from the group consisting of methyl glycidyl methacrylate, methyl glycidyl acrylate, allyl glycidyl ether, allylphenol glycidyl ether and glycidyl methacrylate, and
   c) from 5 to 25 percent by weight of one or more vinyl esters of straight-chain or branched alkylcarboxylic acids having from 1 to 18 carbon atoms c), selected from the group consisting of vinyl acetate, vinyl propionate, vinyl butyrate, vinyl 2-ethylhexanoate, vinyl laurate, 1-methyl vinyl acetate, vinyl pivalate and vinyl esters of α-branched monocarboxylic acids having 9 to 13 carbon atoms, and
   d) from 0 to 40 percent by weight of further monomer(s) d), different from a), b), and c), and copolymerizable with a), b) and c), the further monomers being selected from the group consisting of (meth)acrylate esters of $C_{1-18}$ branched or straight chain alcohols and mixtures thereof, the percents by weight of a), b), c), and d) totaling 100% by weight,
   and subsequently drying an aqueous dispersion obtained thereby, wherein said polymerizing is effected by means of suspension polymerization with from 0.02 to 5 weight percent of one or more aldehyde regulators, and wherein from 0.005 to 0.05 weight percent of ascorbic acid and/or isoascorbic acid, and optionally from 0.001 to 0.1 weight percent of citric acid, based on the total weight of monomers a) through d) are present during and/or after polymerizing but prior to drying the aqueous dispersion to form a solid product.

2. The process of claim 1, wherein from 5 to 15% by weight of the epoxide-containing vinyl monomers b) are polymerized.

3. The process of claim 1, wherein the epoxide-containing vinyl monomer consists of glycidylmethacrylate.

4. The process of claim 1, wherein one or more further monomers are polymerized and, selected from the group consisting of methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate and 2-ethylhexyl acrylate.

5. The process of claim 1, wherein polymerizing is effected with propionaldehyde as a regulator.

6. A coating binder, comprising the product produced by the process of claim 1.

7. A process for adhesive bonding, comprising applying an adhesive comprising the product produced by the process of claim 1 to at least one substrate to be bonded to a second substrate, and contacting said substrates together.

8. The process of claim 7, wherein one of said substrates comprises a security feature.

9. The process of claim 1, wherein a vinyl ester comonomer c) is vinyl acetate in an amount of 5 to 15 weight percent.

10. The process of claim 9, wherein at least one further monomer d) is present.

11. The process of claim 9, wherein the aldehyde regulator is present in an amount of 0.02 to 5 weight percent based upon the total weight of monomers a) through d).

12. The process of claim 1, wherein vinyl chloride is polymerized in an amount of 70 to 90 percent by weight.

13. The process of claim 1, wherein vinyl chloride is polymerized in an amount of 75 to 85 percent by weight.

14. The process of claim 9, wherein the epoxide-containing vinyl monomers are polymerized in an amount of 8 to 15 weight percent.

15. The process of claim 14, wherein vinyl chloride is polymerized in an amount of 75 to 85 percent by weight.

16. The process of claim 1, wherein the vinyl ester monomers c) are polymerized in an amount of from 5 to 15 weight percent.

17. A process for preparation of epoxy-modified vinyl chloride-vinyl ester copolymers as a solid resin, comprising free radically polymerizing an aqueous mixture comprising
   a) from 75 to 85 percent by weight of vinyl chloride,
   b) from 8 to 15 percent by weight of one or more epoxide-containing vinyl monomers selected from the group consisting of methyl glycidyl methacrylate, methyl glycidyl acrylate, allyl glycidyl ether, allylphenol glycidyl ether and glycidyl methacrylate as monomers b), and
   c) from 5 to 15 percent by weight of one or more vinyl esters of straight-chain or branched alkylcarboxylic acids having from 1 to 18 carbon atoms, selected from the group consisting of vinyl acetate, vinyl propionate, vinyl butyrate, vinyl 2-ethylhexanoate, vinyl laurate, 1-methyl vinyl acetate, vinyl pivalate and vinyl esters of α-branched monocarboxylic acids having 9 to 13 carbon atoms, and
   d) from 0 to 40 percent by weight of further comonomers different from a), b), and c), and copolymerizable with a), b) and c), the further monomers being selected from the group consisting of (meth)acrylate esters of $C_{1-18}$ branched or straight chain alcohols and mixtures thereof, the percents by weight of a), b), c), and d) totaling 100% by weight,
   and subsequently drying an aqueous dispersion obtained thereby, wherein said polymerizing is effected by means of suspension polymerization with one or more aldehyde regulators in an amount of from 0.02 to 5% by weight based on the total weight of the monomers a) through d) polymerized, and wherein from 0.005 to 0.05 weight percent of ascorbic acid and/or isoascorbic acid, and optionally from 0.001 to 0.1 weight percent of citric acid, based on the total weight of monomers a) through d) are present during and/or after polymerizing but prior to drying the aqueous dispersion to form a solid product.

18. The process of claim 1, wherein the vinyl ester monomer b) consists of vinyl acetate.

* * * * *